United States Patent
Song et al.

(10) Patent No.: US 11,126,818 B2
(45) Date of Patent: Sep. 21, 2021

(54) SHEET AND AN OPTICAL FINGERPRINT SCANNER

(71) Applicant: LG CHEM, LTD., Seoul (KR)

(72) Inventors: Min Soo Song, Daejeon (KR); Jae Jin Kim, Daejeon (KR); Ji Young Hwang, Daejeon (KR); Dae Han Seo, Daejeon (KR); Se Woo Yang, Daejeon (KR); Sang Choll Han, Daejeon (KR); Tae Hee Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/760,884

(22) PCT Filed: Oct. 11, 2018

(86) PCT No.: PCT/KR2018/011956
§ 371 (c)(1),
(2) Date: Apr. 30, 2020

(87) PCT Pub. No.: WO2019/093662
PCT Pub. Date: May 16, 2019

(65) Prior Publication Data
US 2021/0182524 A1    Jun. 17, 2021

(30) Foreign Application Priority Data
Nov. 7, 2017    (KR) .................. 10-2017-0147033

(51) Int. Cl.
*G06K 9/00*    (2006.01)

(52) U.S. Cl.
CPC .................. *G06K 9/0004* (2013.01)

(58) Field of Classification Search
CPC .................................................. G06K 9/0004
See application file for complete search history.

(56) References Cited

U.S. PATENT DOCUMENTS

| | | |
|---|---|---|
| 5,986,746 A | 11/1999 | Metz et al. |
| 6,011,860 A | 1/2000 | Fujieda et al. |
| (Continued) | | |

FOREIGN PATENT DOCUMENTS

| | | |
|---|---|---|
| CN | 107561754 A | 1/2018 |
| EP | 2131322 A1 | 12/2009 |
| (Continued) | | |

*Primary Examiner* — Stephen G Sherman
(74) *Attorney, Agent, or Firm* — Dentons US LLP (57) ABSTRACT

The present application relates to a sheet comprising, in a single layer, a first light control part capable of providing light always totally reflected only in a specific interlayer laminate structure among sheet constructions; and a second light control part capable of providing light whose total reflection is determined according to a fingerprint pattern in contact with the surface layer of the sheet by changing a part of the light provided from the first light control part and totally reflected in the specific interlayer laminate structure at a predetermined angle and emitting it to reach the surface layer of the sheet without being totally reflected in the specific interlayer laminate structure, and a device thereof. The sheet has excellent user identification or authentication capability through a fingerprint and can be applied to a large area display device to recognize a plurality of fingerprint patterns without being influenced by each other.

15 Claims, 1 Drawing Sheet

(56) References Cited

U.S. PATENT DOCUMENTS

2010/0322550 A1    12/2010  Trott
2017/0315293 A1    11/2017  Bang et al.
2018/0268194 A1*   9/2018  Lin ..................... G06K 9/0004

FOREIGN PATENT DOCUMENTS

| | | |
|---|---|---|
| JP | 09509490 A | 9/1997 |
| JP | 10269341 A | 10/1998 |
| JP | 2001-059905 A | 3/2001 |
| JP | 2002-6103 A | 1/2002 |
| JP | 2003-050992 A | 2/2003 |
| JP | 2003270441 A | 9/2003 |
| JP | 2003329836 A | 11/2003 |
| JP | 2004-94062 A | 3/2004 |
| JP | 2005-130091 A | 5/2005 |
| JP | 2005-524096 A | 8/2005 |
| KR | 10-2005-0000455 A | 1/2005 |
| KR | 100682486 B1 | 2/2007 |
| KR | 10-2015-0078823 A | 7/2015 |
| KR | 10-2016-0134017 A | 11/2016 |
| KR | 10-2018-0062350 A | 6/2018 |
| WO | 2011110821 A1 | 9/2011 |

\* cited by examiner

SHEET AND AN OPTICAL FINGERPRINT SCANNER

CROSS-REFERENCE TO RELATED APPLICATIONS

This application is a U.S. National Stage application of PCT/KR2018/011956, filed Oct. 11, 2018 and claims the benefit of priority based on Korean Patent Application No. 10-2017-0147033 filed on Nov. 7, 2017, the disclosure of which is incorporated herein by reference in its entirety.

TECHNICAL FIELD

The present application relates to a sheet usable for optical fingerprint recognition and a device comprising the same.

BACKGROUND ART

Depending on generalization and use frequency increase of portable mobile devices such as smart phones and tablet PCs, security of these devices has been becoming more important. Especially, it is more important to maintain security in electronic commerce and banking fields using these devices. Biological information of a user, for example, fingerprint, iris, face, or voice, can be used to identify or authenticate a device user for security maintenance. In recent years, portable mobile devices to which a user authentication technology through the fingerprint is applied have also been commercialized.

On the other hand, fingerprint recognition methods can be classified into an optical method, an ultrasonic method, an electrostatic capacity method, an electric field measurement method and a heat sensing method, and the like. Among these, the optical fingerprint recognition method can be divided into a so-called scattering method for detecting light scattered in a ridge portion of a fingerprint in direct contact with a transparent fingerprint contact portion of the device, and a so-called total reflection method for detecting light totally reflected from the surface of a fingerprint contact portion corresponding to a valley portion of a fingerprint. In the former case, since light to be scattered must be detected, it may be difficult to provide a light quantity sufficient to identify the fingerprint pattern to the sensor, and the path of the scattered light may overlap the light path of the original light source, so that the contrast may be lowered. And, in the scattering method, a trapezoidal distortion caused by the light path difference also occurs. Devices having various structures have been proposed to solve the above problems through various papers and patents, but it cannot be said that the scattering method is not suitable for portable mobile devices because of the use of bulky prisms or the like. Also, in the latter case, there is an advantage that a greater light quantity can be secured than a method of detecting scattered light, but if the total reflection path is long in the process in which the totally reflected light toward the sensor repeats the total reflection along the waveguide, the lights totally reflected from adjacent fingerprints may interfere with each other to lower the contrast. In addition, when the conventional total reflection method is used, the size of the device can be increased due to the necessity of separately installing a sensor or a prism, and the like, and there is a problem that compatibility with the portable mobile device having a large area display is also poor, because input and output structures of the fingerprint recognition device are very limited, as the sensor is positioned at the opposite end of one end of the waveguide where the light source is positioned.

DISCLOSURE

Technical Problem

It is one object of the present application to provide a sheet for optical fingerprint recognition (or input) capable of detecting fingerprint information with high contrast irrespective of the degree of contamination of the fingerprint contact portion and a device comprising the same.

It is another object of the present application to provide a sheet for optical fingerprint recognition (or input) which has a simple structure and is capable of simultaneously recognizing a plurality of fingerprints in a large area, and a device comprising the same.

The above objects of the present application and other objects can be all solved by the present application which is described in detail below.

Technical Solution

In order to solve the problems of the prior art described above and to achieve the above objects, the present application provides a sheet comprising, in a single layer, a first light control part capable of providing light always totally reflected only in a specific interlayer laminate structure among sheet constructions; and a second light control part capable of providing light whose total reflection is determined according to a fingerprint pattern in contact with the surface layer of the sheet by changing a part of the light provided from the first light control part and totally reflected in the specific interlayer laminate structure at a predetermined angle and emitting it to reach the surface layer of the sheet without being totally reflected in the specific interlayer laminate structure, and a device thereof.

Advantageous Effects

The present application can provide a sheet for optical fingerprint recognition that can provide fingerprint information with high contrast and recognize a plurality of fingerprint patterns without any influence on each other. In addition, the present application can provide a device capable of having a large-area sensor and a screen display device without being restricted by incidence and emission structures. Furthermore, the present application can provide a sheet and a device which can exhibit the above effect irrespective of the degree of contamination of the sheet fingerprint contact portion.

Hereinafter, a sheet according to one embodiment of the present application and a device comprising the same will be described in detail with reference to the accompanying drawings. For ease of explanation, the size or shape of each constitution shown may be exaggerated or reduced.

BEST MODE

In one example related to the present application, the present application relates to a sheet for optical fingerprint recognition or a sheet for optical fingerprint input. The sheet comprises an optical film having a predetermined laminated constitution. As described below, the sheet of the present application can be configured such that light derived from an external light source can exist in an optical film having a predetermined laminated structure as two lights (rays) at different angles. One of the lights (rays) can always be totally reflected in the optical film having a predetermined laminated constitution. The other light (ray) may not be totally reflected in the optical film having a predetermined laminated constitution. Specifically, the other light ray passes through the optical film having a predetermined laminated constitution, and then is determined whether or not it is totally reflected at the surface layer of the sheet depending on the pattern of the material contacting the outside of the sheet, and it reaches the lower part of the sheet or passes through this after being totally reflected, whereby it can be identified by the sensor positioned on the lower part of the sheet. At this time, the predetermined laminated constitution means a constitution in which a light control layer is located between two opposing low refractive layers, as described below. Also, in the present application, the surface layer of the sheet relates to a transparent base layer to be described below, which may mean the upper surface of the transparent base layer in contact with the air or may mean the upper surface of the transparent base layer in direct or indirect contact with an object having a pattern like a fingerprint.

Figure 1:
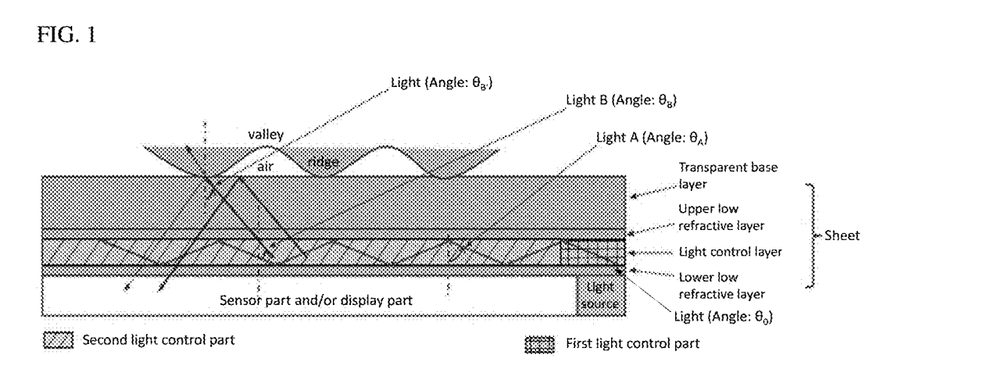
FIG. 1 schematically shows a cross-section of a sheet for optical fingerprint recognition (or input) according to one embodiment of the present application and a device comprising the same.

In this regard, FIG. 1 schematically shows a cross-section of a sheet for optical fingerprint recognition (or input) according to one embodiment of the present application and a device comprising the same. The present application will be described with reference to FIG. 1 as follows.

The sheet of the present application may comprise an optical film having two opposing low refractive layers and a light control layer positioned therebetween. That is, the optical film used in the sheet of the present application may comprise a lower low refractive layer, a light control layer positioned on the lower low refractive layer, and an upper low refractive layer positioned on the light control layer. In the present application, the term "on" or "above" used in connection with the interlayer lamination position may mean including not only the case where a constitution is formed directly on another constitution but also the case where a third constitution is interposed between these constitutions. Also, in the present application, for example, when the light control layer is interposed between two layers, the term "low refractive layer" may mean a case where any one layer has a relatively low refractive index as compared with the adjacent layers, as in the case where the refractive index of the two layers is lower than that of the light control layer.

The light control layer comprises a first light control part and a second light control part. The light control parts may be constitution provided so as to perform a predetermined function only on light incident at a specific angle. Accordingly, as described below, the first light control part can provide light that is always totally reflected to the lower surface of the upper low refractive layer and the upper surface of the lower low refractive layer, respectively. Furthermore, the second light control part can provide light that can pass through the upper low refractive layer, specifically, the optical film having a predetermined laminated constitution, and be determined at the sheet surface layer whether or not it is totally reflected depending on the fingerprint pattern contacting the sheet surface layer, to the sheet surface layer. In the present application, the "lower surface" may mean one side of a light control layer (or light control part), an upper low refractive layer, and a transparent base layer which face or are in contact with the lower low refractive layer, and the "upper surface" may mean one side opposite to a light control layer (or light control part), a upper low refractive layer and a transparent base layer, having the relevant lower surface. The lower surface or the upper surface may be referred to as a light-entering surface or an incident surface, and a light-emitting surface or an exit surface, depending on the traveling path of light.

As shown in FIG. 1, the first light control part can emit the light (A) with a second angle ($\theta_A$) different from the first angle ($\theta_0$) to the lower surface of the upper low refractive layer, out of the light incident at a first angle ($\theta_0$) with respect to the lower surface of the first light control part through the lower low refractive layer. In one example, the exit surface of the first light control part, from which the light with the second angle ($\theta_A$) is emitted, may be any other surface or any inside region other than the lower surface of the first light control part. More specifically, the sheet of the present application can be configured so that the light with the second angle ($\theta_A$) can be emitted from the side surface and/or upper surface of the first light control part or any region and/or point inside the first light control part. At this time, the light with the second angle ($\theta_A$) may be light totally reflected, for example, from the lower surface of the upper low refractive layer such as the interface between the upper low refractive layer and the light control layer, and for example, from the upper surface of the lower low refractive layer such as the interface between the lower low refractive layer and the light control layer. In the present application, the term "interface" may mean a boundary surface between two adjacent layers, or a boundary surface between heterogeneous media placed on a path through which light passes. In the present application, the angle is an angle formed by the traveling direction of light from the normal to the sheet (or light-entering layer or light-entering surface) placed on the horizontal plane, and its unit is ° (degree), which may have more than 0° to less than 90°. Furthermore, the angle that the light has may be referred to as an exit angle depending on the relative position of each constitution along the traveling direction of light.

As shown in FIG. 1, the second light control part can emit, for example, the light which is totally reflected from the lower surface of the upper low refractive layer to be incident at a second angle ($\theta_A$) to the second light control part as the light (A) with the second angle ($\theta_A$) and the light (B) with a third angle ($\theta_B$) different from the second angle ($\theta_A$) to the lower surface of the upper low refractive layer. In one example, the exit surface of the second light control part, from which the light with the second angle ($\theta_A$) and the light with the third angle ($\theta_B$) are emitted, may be any other surface or any inside region other than the lower surface of the second light control part. More specifically, the sheet of the present application can be configured so that the light with the second angle ($\theta_A$) and the light (B) with the third angle ($\theta_B$) can be emitted from the side surface and/or upper surface of the second light control part or any region and/or point inside the second light control part. At this time, the light with the third angle ($\theta_B$) may be light which is not totally reflected from the lower surface of the upper low refractive layer, for example, the interface between the upper low refractive layer and the light control layer, and is transmitted through the lower surface of the upper low refractive layer, or the upper low refractive layer.

Since the light control layer of the present application can be divided into two parts in which the angle or path of light, and the like can be controlled differently from each other as above, two lights (A and B) having different angles can be provided (emitted) toward the upper low refractive layer positioned on the light control layer, specifically, with respect to the upper low refractive layer, and more specifically, with respect to the lower surface of the upper low refractive layer, as in FIG. 1.

In one specific example, the sheet of the present application can be provided so that the light with the second angle ($\theta_A$) emitted from the first light control part toward the upper low refractive layer can be totally reflected from both of the lower surface of the upper low refractive layer and the upper surface of the lower low refractive layer by satisfying the following relational expressions 1 and 2. That is, the first light control part can convert the light incident at the first angle ($\theta_0$) with respect to the lower surface into the light with the second angle ($\theta_A$) satisfying the following relational expressions 1 and 2 to emit it toward the upper surface of the light control layer or the lower surface of the upper low refractive layer. The relational expressions described below can be obtained using Snell's law.

$$\theta_A > (180°/\pi) \times \sin^{-1}(n_2/n_3) \qquad \text{[Relational Expression 1]}$$

Relational Expression 1 above exemplarily defines the condition that the light with the second angle ($\theta_A$) traveling from the light control layer to the upper low refractive layer is totally reflected from the lower surface of the upper low refractive layer, for example, the interface between the light control layer and the upper low refractive layer. In Relational Expression 1 above, $n_2$ is the refractive index of the upper low refractive layer, $n_3$ is the refractive index of the first light control part or the second light control part of the light control layer, and $n_3$ is larger than $n_2$.

$$\theta_A > (180°/\pi) \times \sin^{-1}(n_4/n_3) \qquad \text{[Relational Expression 2]}$$

Relational Expression 2 above exemplarily defines the condition that when the light satisfying Relational Expression 1 is totally reflected from the lower surface of the upper low refractive layer, is incident on the light control layer and then faces the lower low refractive layer, it is totally reflected from the upper surface of the lower low refractive layer, for example, the interface between the lower low refractive layer and the light control layer. In Relational Expression 2 above, $n_3$ is the refractive index of the first light control part or the second light control part of the light control layer, $n_4$ is the refractive index of the lower low refractive layer, and $n_3$ is larger than $n_4$.

As described above, the sheet of the present application can be provided so that the totally reflected light always totally reflected within the predetermined laminated structure can exist. On the other hand, in the present application, since the light with the second angle ($\theta_A$) is light that the total reflection is always performed irrespective of whether or the fingerprint contacts, the light quantity in the sheet can be maintained at a certain level. And, as described below, since the light with the angle ($\theta_{B'}$) used for fingerprint recognition originates from the light with the angle ($\theta_B$) converted from the totally reflected light with the angle ($\theta_A$), the light with the angle ($\theta_{B'}$) for generating the fingerprint image can also have a light quantity kept constant in the sheet irrespective of whether or not the fingerprint contacts.

The second light control part can emit the light that is totally reflected from the lower surface of the upper low refractive layer and the upper surface of the lower low refractive layer to be incident on the second light control part at the second angle ($\theta_A$) as the light (A) with the second angle ($\theta_A$) and the light (B) with the third angle ($\theta_B$) different from the second angle ($\theta_A$) toward the upper surface of the second light control part or the lower surface of the upper low refractive layer. That is, the second light control part can convert a part of the light (A) having an angle ($\theta_A$) into the light (B) having an angle ($\theta_B$). The conversion degree, that is, the ratio, in which the light (A) incident at $\theta_A$ is converted to the light (B) with $\theta_B$ and emitted, is not particularly limited, which may be suitably adjusted in a range of more than 0% to less than 100%. At this time, $\theta_A$ and $\theta_B$ may be an (incident) angle that the light emitted from the first light control part and the light emitted from the second light control part have each with respect to the lower surface of the upper low refractive layer as the incident surface. In the present application, the light with the third angle ($\theta_B$) is generated by the second light control part irrespective of whether or not the fingerprint contacts.

In the present application, the light with the third angle ($\theta_B$) generated by the second light control part can be used for fingerprint recognition, as described below. In order to be used for fingerprint recognition, the light with the third angle ($\theta_B$) emitted from the second light control part should pass through the upper low refractive layer without being totally reflected in the optical film of the laminated structure to reach the surface layer of the sheet that the fingerprint contacts.

With respect to the third angle ($\theta_B$), the sheet of the present application may be provided such that light with the third angle ($\theta_B$) emitted from the second light control part satisfies the following relational expression 3 to be transmitted through the upper low refractive layer.

$$\theta_B < (180°/\pi) \times \sin^{-1}(n_2/n_3) \qquad \text{[Relational Expression 3]}$$

Relational Expression 3 above exemplarily defines the condition that the light with the third angle ($\theta_B$) from the second light control part of the light control layer toward the upper low refractive layer is not totally reflected from the lower surface of the upper low refractive layer. That is, Relational Expression 3 above means the condition that the light with the angle ($\theta_B$) emitted from the second light control part can pass through the lower surface of the upper low refractive layer, or the upper low refractive layer. In Relational Expression 3 above, $n_2$ is the refractive index of the upper low refractive layer, $n_3$ is the refractive index of the first light control part or the second light control part of the light control layer, and $n_3$ is larger than $n_2$.

In one example, the sheet of the present application may further comprise a transparent base layer that a fingerprint can contact directly or indirectly. When the sheet comprises a transparent base layer, the transparent base layer may be located on the upper low refractive layer. That is, the sheet may sequentially comprise a lower low refractive layer, a light control layer, an upper low refractive layer and a transparent base layer. In the present application, the term "transparent" used in relation to the properties of the layer may mean a case where the lower limit of the transmittance to visible light having a wavelength of 380 nm to 780 nm is 65% or more, 70% or more, 75% or more, 80% or more, 85% or more, 90% or more, or 95% or more, and the upper limit is about 100%, which is in a range of less than 100%.

The information of the fingerprint in contact with the transparent base layer can be transmitted to the sensor by such a constitution. That is, the light incident on the first light control part from the light source via the lower low refractive layer is emitted as the light with the angle $\theta_A$ that can be always totally reflected from the lower surface of the upper low refractive layer and the upper surface of the lower low refractive layer, respectively, by the first light control part, and the light with the angle $\theta_A$ emitted from the first light control part is incident on the second light control part while being totally reflected irrespective of whether or not the fingerprint and the transparent base layer contact. And, the second light control part converts a part of the light incident at the angle $\theta_A$ into the light with the angle $\theta_B$ and emits the light toward the upper low refractive layer and the transparent base layer. At this time, the light with the angle $\theta_A$ not converted into the light with the angle $\theta_B$ in the second light control part is totally reflected from the upper surface of the lower low refractive layer. In addition, the light incident on the lower surface of the upper low refractive layer at the angle $\theta_B$ may be converted (refracted) into light with a fourth angle $\theta_{B'}$ different from the angle $\theta_B$ to be incident on the transparent base layer while passing through the upper low refractive layer to be incident on the transparent base layer. And, in the present application, the sheet can be configured so that the light with the fourth angle ($\theta_{B'}$) is transmitted from the ridge of the fingerprint, which is a contact portion of the transparent base layer and the fingerprint, and is totally reflected from the valley of the fingerprint, which is a non-contact portion of the transparent base layer and the fingerprint. And, the sheet of the present application can be configured so that the light totally reflected from the valley portion of the fingerprint can be recognized by the sensor by reaching the lower low refractive layer via the upper low refractive layer and the light control layer or passing through the lower low refractive layer. In addition, when the light with the fourth angle ($\theta_{B'}$) is transmitted through the upper surface of the transparent base layer from the ridge of the fingerprint, scattering and/or reflection may occur together with transmission.

In Korean Patent Application No. 10-2017-0147008, the inventors of the present application have proposed, in relation to a sheet and device for fingerprint recognition or input, an invention that one of interfaces from which the always totally reflected light can be totally reflected is the uppermost surface of the sheet that the fingerprint contacts, that is, the upper surface of the transparent base layer. Although the sheet and device proposed in the application are intended to solve the problems of the prior art, they have found a problem that some of the light totally reflected by various causes may be lost. The causes of loss of the totally reflected light may include contamination of the transparent base layer, contact of the transparent base layer with water, or difference in magnitude of pressure applied in the fingerprint. However, in the present application, the interface from which the totally reflected light with the angle ($\theta_A$), which can be always totally reflected in a predetermined laminated structure irrespective of whether or not the fingerprint contacts and can be converted into the light ($\theta_{B'}$) with the angle used for fingerprint recognition through a predetermined path, is totally reflected is positioned inside the sheet rather than the surface layer side of the sheet, so that there is an advantage that it is less sensitive to external factors such as contamination of the transparent base layer or the state of the fingerprint.

According to one embodiment of the present application, in order to perform functions as above, the sheet of the present application may be constituted or provided as follows.

In one example, the first light control part and the second light control part may comprise each a diffractive optical element or a refractive optical element.

The refractive optical element may mean an element having a characteristic in which the traveling direction or angle of light is determined by the refractive index difference with the adjacent medium. When the light control part of the present application is a refractive optical element, the light control part may be configured in consideration of refractive indexes between the respective layers so as to satisfy the optical path described in the present application.

The diffractive optical element may mean an element having a characteristic in which the traveling direction or angle of light is determined by the shape of the pattern and the spacing between the patterns. When the light control part of the present application is a diffractive optical element, the light control part may be configured in consideration of refractive indexes between the respective layers and diffraction patterns so as to satisfy the optical path described in the present application.

In one example, the light control layer of the present application may comprise a diffractive optical element. Specifically, the first light control part and the second light control part may comprise diffractive optical elements having different functions from each other, where the diffractive optical element may be a holographic optical element (HOE) in the form of a film. The holography is a technique for recording an interference pattern in a photosensitive medium to reproduce a three-dimensional image called a hologram. Also, the holographic film may mean a film on which a holographic recording is recorded, and may mean a film capable of recording an interference pattern on a film having very small photosensitive particles using recording light and reproducing it using reproduction light. Since the holographic film may perform the function only for the recorded light and may not perform the required function for light other than the recorded light, when the holographic film is used for the first light control part and the second light control part, it is particularly advantageous to adjust the angle, the optical path and/or the light quantity of light required in the present application.

The holographic film may comprise a photosensitive material as a recording medium. As the photosensitive material, a photopolymer, a photoresist, a silver halide emulsion, a dichromated gelatin, a photographic emulsion, a photothermoplastic or a photorefractive material, and the like can be used. In one example, the holographic film may comprise a photopolymer as a photosensitive material, and may be, specifically, a film consisting only of a photopolymer, or a film with a double-layered structure comprising a photopolymer layer and a substrate for the layer together. In this case, the substrate used together with the photopolymer may be a transparent substrate and may be, for example, a substrate comprising polycarbonate (PC), polypropylene (PP), polyamide (PA), polyethylene terephthalate (PET) or triacetyl cellulose (TAC), and the like, but is not particularly limited.

In one example, the diffraction efficiencies of the first light control part and the second light control part may be the same or different from each other. Specifically, the first light control part may have the same diffraction efficiency in its entire area and the second light control part may also have the same diffraction efficiency in its entire area, where the diffraction efficiencies of the respective light control parts may be the same or different from each other.

In one example, the first light control part and the second light control part may be some regions formed by changing only angles or diffraction patterns of recording light on one layer, respectively. Alternatively, the light control layer may also be formed by directly attaching the first light control part and the second light control part or by attaching them via another medium, so that the first light control part and the second light control part, which are separately manufacture, may form a single layer.

When the transmittance described above is satisfied, the kind of the transparent base layer is not particularly limited. For example, it may comprise glass or a polymer resin. As the polymer resin, a polyester film such as PC (polycarbonate), PEN (poly(ethylene naphthalate)) or PET (poly(ethylene terephthalate)), an acrylic film such as PMMA (poly(methyl methacrylate)) or a polyolefin film such as PE (polyethylene) or PP (polypropylene) may be used, without being limited thereto. In one example, the transparent base layer may have a constitution in which a number of glass or polymer resins are laminated. Even in the case of having such a laminated constitution, the transparent base layer may be provided so as to perform the functions required in the present application and satisfy the following relational expressions.

In one example, the transparent base layer may further comprise one or more of functional films consisting of a hardness-enhancing film, an antifouling film, an antireflection film, and a decoration film. For example, when the transparent base layer comprises glass and a functional film, the glass may be positioned on the surface layer of the sheet in contact with the fingerprint as a so-called cover glass, and the functional film may be interposed between the glass and the upper low refractive layer. Or one or more of the functional films may be positioned on the glass. Even in the case of having such a constitution, the transparent base layer may be provided so that it performs the function described in the present application and satisfies the relational expressions defined in the present application.

In one example, the upper low refractive layer and the lower low refractive layer may be a pressure-sensitive adhesive layer satisfying refractive indexes and relational expressions, defined in the present application. The kind or composition of the pressure-sensitive adhesive layer is not particularly limited and may be, for example, an acrylic pressure-sensitive adhesive layer or a silicone pressure-sensitive adhesive layer. In another example, the lower base layer may further comprise, in addition to the pressure-sensitive adhesive material, the above-described transparent resin film, where these may function as a substrate for the pressure-sensitive adhesive material, or may be used for the purpose of imparting other functions. Even in the case of having such a constitution, the lower base layer may be provided so that it performs the function required in the present application and satisfies the following relational expressions.

In the present application, the lower low refractive layer, the light control layer, the upper low refractive layer and the transparent base layer may have each the same or different refractive indexes. In one example, the layers may each independently have a refractive index in a range of more than 1 to 5 or less, or more than 1 to 3 or less, and the interlayer refractive index difference may be 0.0001 to 2 or less. In the case of the light control layer, the refractive indexes of the first light control part and the second light control part can be adjusted to be the same or different in a range that can perform the functions required in the present application.

In one example, the refractive index of the upper low refractive layer may be smaller than the refractive index of the light control layer and the refractive index of the transparent base layer. Similarly, the refractive index of the lower low refractive layer may be smaller than the refractive index of the light control layer and the refractive index of the transparent base layer. Although not particularly limited, when the refractive index relationship is satisfied, the refractive index difference between the low refractive layer and the light control layer or the low refractive layer and the transparent base layer may be 0.1 or less.

In one example, the transparent base layer may have a higher refractive index than the light control layer. Although not particularly limited, when the refractive index relationship is satisfied, the refractive index difference between the transparent base layer and the light control layer may be 0.05 or less.

In the present application, the thickness of the upper low refractive layer, the lower low refractive layer, the light control layer, the transparent base layer, or other constitution that may be contained is not particularly limited. For example, if the function of the sheet described in the present application is exerted, the thickness of the constitutions is not limited, and exemplarily, the lower limit may be 0.1 μm or more, or 1 μm or more and the upper limit may be 1,000 μm or less or 500 μm or less.

In the sheet having the constitutions of the present application, the total reflection of the light, which is emitted from the second light control part at the third angle ($\theta_B$) to be transmitted through the upper low refractive layer, from the upper surface of the transparent base layer can be determined depending on whether an object having different heights is present on the transparent base layer or the object has a certain pattern. In this regard, when the refractive index of the transparent base layer is higher than the refractive index of the upper low refractive layer and the light incident on the lower surface of the upper low refractive layer at the third angle ($\theta_B$) is incident on the transparent base layer at the fourth angle ($\theta_{B'}$) different from the third angle ($\theta_B$) whiling passing through the upper low refractive layer, the sheet of the present application may be provided such that the light with the fourth angle ($\theta_{B'}$) satisfies the following relational expressions 4 and 5.

$$\theta_{B'} > (180°/\pi) \times \sin^{-1}(n_0/n_1) \qquad \text{[Relational Expression 4]}$$

Relational Expression 4 above exemplarily defines the condition that light with the fourth angle ($\theta_{B'}$) is totally reflected from the upper surface of the transparent base layer in contact with air. In Relational Expression 4 above, no is 1 as the refractive index of air, and m is the refractive index of the transparent base layer.

$$\theta_{B'} < (180°/\pi) \times \sin^{-1}(n_h/n_1) \qquad \text{[Relational Expression 5]}$$

When the object having a pattern with different heights contacts the transparent base layer, Relational Expression 5 above exemplarily defines the condition that the light with the fourth angle ($\theta_{B'}$) is transmitted from the upper surface of the transparent base layer that the object having a pattern with different heights and the transparent base layer directly contact (or transmission, scattering, and reflection can occur simultaneously). In Relational Expression 5 above, $n_1$ is the refractive index of the transparent base layer and $n_h$ is the refractive index of the portion of the object having a pattern with different heights in direct contact with the transparent base layer. At this time, the object having a pattern with different heights may be a fingerprint, and the portion of the object having a pattern with different heights in direct contact with the transparent base layer may be a ridge of the fingerprint. On the other hand, the portion of the object having a pattern with different heights that does not directly contact the transparent base layer may be a valley of the fingerprint, and since the valley portion is occupied by the air, the refractive index of the valley portion can be regarded as 1 (=$n_0$). In this way, the light with the angle ($\theta_{B'}$) may be a light that when the object does not exist on the transparent base layer, it is totally reflected from the interface between the transparent base layer and the air, but when the object having a pattern with different heights contact the transparent base layer is transmitted from the direct contact portion (ridge) of the object to the transparent base layer (or transmission, scattering, and reflection can occur simultaneously).

Also, in the present application, the sheet may be provided such that the light with the fourth angle ($\theta_{B'}$) totally reflected from the upper surface of the transparent base layer in contact with air can be transmitted through the upper surface of the upper low refractive layer. When the refractive index of the transparent base layer is larger than that of the upper low refractive layer, the total reflection must not occur at the upper surface of the upper low refractive layer, that is, the interface between the upper low refractive layer and the transparent base layer, so that the light with the fourth angle ($\theta_{B'}$) may satisfy the following relational expression 6.

$$\theta_{B'} < (180°/\pi) \times \sin^{-1}(n_2/n_1) \qquad \text{[Relational Expression 6]}$$

When the refractive index of the transparent base layer is larger than the refractive index of the upper low refractive layer, Relational Expression 6 above exemplarily defines the condition that the total reflection cannot occur at the interface between the transparent base layer and the upper low refractive layer and the light with the fourth angle ($\theta_{B'}$) can be transmitted through the upper surface of the upper low refractive layer. In Relational Expression 6 above, $n_1$ is the refractive index of the transparent base layer, $n_2$ is the refractive index of the upper low refractive layer, and $n_1$ is larger than $n_2$.

Furthermore, the sheet of the present application can be provided so that the light totally reflected at the interface between the transparent base layer and air in the light with the fourth angle ($\theta_{B'}$) can reach the lower surface of the lower low refractive layer or be transmitted through the lower low refractive layer, while passing through the upper low refractive layer and the light control layer. The light reaching the lower low refractive layer or transmitted through the lower low refractive layer can be recognized by the sensor located below the lower low refractive layer. To this end, the light transmitted through the upper low refractive layer should not be totally reflected from the upper surface of the lower low refractive layer, that is, the interface between the light control layer and the lower low refractive layer. In this regard, the light with the fourth angle ($\theta_{B'}$) may satisfy the following relational expression 7.

$$\theta_{B'} < (180°/\pi) \times \sin^{-1}(n_4/n_1) \qquad \text{[Relational Expression 7]}$$

Relational Expression 7 above exemplarily defines the condition that after the light with the fourth angle ($\theta_{B'}$) is totally reflected from the interface between the transparent base layer and air, it can reach the lower low refractive layer (lower surface) or be transmitted through the lower low refractive layer, via the upper low refractive layer and the light control layer. In Relational Expression 7 above, $n_1$ is the refractive index of the transparent base layer and $n_4$ is the refractive index of the lower low refractive layer.

When the angle $\theta_{B'}$ of the light totally reflected from the surface layer of the transparent base layer as above satisfies Relational Expressions 6 and 7 above, the sensor existing in the lower part of the sheet can recognize the light reaching the lower low refractive layer (lower surface) or passing through the lower low refractive layer, as shown in FIG. 1. That is, the sheet of the present application allows the user's fingerprint to be recognized using a method of identifying a difference in light quantity between the light totally reflected from the upper surface of the transparent base layer in contact with air and the light transmitted (or transmission, scattering and reflection can occur simultaneously) from the direct contact portion of the transparent base layer and the object among the light with the fourth angle ($\theta_{B'}$) originating from the light with the third angle ($\theta_B$) emitted from the second light control part.

As such, the present application does not directly use the light always totally reflected in the sheet for fingerprint identification. Specifically, when a part of the light with the second angle ($\theta_A$) provided from the first light control part to be always totally reflected irrespective of whether or not the fingerprint contacts is converted into the light with the third angle ($\theta_B$) different from $\theta_A$ by the second light control part and emitted toward the transparent base layer, and the light with the fourth angle ($\theta_{B'}$) reaching the surface layer of the transparent base layer is totally reflected from the surface of the transparent base layer in contact with an external object to the inside of the sheet and transmitted (or transmission, scattering and reflection can occur simultaneously) to the outside of the sheet, the present application uses the light quantity difference of these lights for fingerprint identification. That is, the difference between the light quantity of the light totally reflected from the non-contact portion with the fingerprint and traveling to the sensor and the light quantity of the light transmitted (or transmission, scattering and reflection can occur simultaneously) from the contact portion with the fingerprint and reduced, among the lights at the angle $\theta_{B''}$ is used for fingerprint identification.

Furthermore, in the present application, the light with the angle $\theta_{B'}$ is originated from the light always totally reflected in the sheet regardless of the presence or absence of the fingerprint. Therefore, in the present application, the light quantity of the light used for identifying the fingerprint can be kept constant by using the light always totally reflecting the inside of the sheet, and consequently, the light quantity difference between the light totally reflected from the interface of the transparent base layer and the air, and the light transmitted (or transmission, scattering and reflection can occur simultaneously) from the direct contact portion of the transparent base layer and the object, among the lights with the angle ($\theta_{B'}$), can be more clearly recognized by the sensor. Besides, in the present application, the light totally reflected from the interface between the transparent base layer and the air and the light transmitted (or transmission, scattering and reflection can occur simultaneously) from the direct contact portion of the transparent base layer and the object, among the lights with the angle ($\theta_B$ or $\theta_{B'}$) generated regardless of the presence or absence of the fingerprint, are used for fingerprint identification, so that even if a number of fingerprint patterns are in contact with the transparent base layer, they can be identified without being influenced by each other.

In one example, a projected area (S1) of the first light control part may be smaller than a projected area (S2) of the second light control part. In the present application, the term "projected area" may mean, on observing the sheet from the upper part or the lower part in a direction parallel to the normal direction of its surface, an area in which the relevant constitution is viewed, and for example, an orthogonal projection area. Therefore, the increase or decrease of the actual area due to the unevenness of the area comparison target constitution or the like is not considered. Although not particularly limited, S1: S2 may be in a range of 5 to 40:60 to 95.

In another example related to the present application, the present application relates to an optical fingerprint recognition device (fingerprint scanner) or a fingerprint input device.

In one example, the device may further comprise a light source part. The light source part means a constitution capable of radiating light toward the sheet. The specific constitution of the light source part is not particularly limited as long as the above function can be performed. As in FIG. 1, the light source part may be located on one surface of the sheet lower low refractive layer, more specifically, on the opposite one surface of one surface of the lower low refractive layer where the first light control part contacts. The light incident from the light source part is incident on the first light control part of the light control layer via the lower low refractive layer, whereby the light that can be always totally reflected in the sheet can be provided to the sheet. In one example, the light incident on the first light control part may be vertical to the bottom surface of the first light control part. In the present application, the term "vertical" means a substantial verticalness in a range that does not impair the desired effect, which is used, for example, in consideration of manufacturing error or variation, and the like. At this time, the error or variation may be within ±10°, within ±8°, within ±6°, within ±4°, within ±2°, within ±1°, within ±0.5°, within ±0.2°, or within ±0.1°. The light source part is provided so as to emit vertical light to the first light control part.

In one example, the device may further comprise a sensor part. The sensor part may mean a constitution for sensing the light reaching the lower low refractive layer or transmitted through the lower low refractive layer. The constitution of the sensor part is not particularly limited as long as the above function can be performed, where a known sensor can be used. As in FIG. 1, the sensor part may be located on one surface of the sheet lower low refractive layer, more specifically, on the opposite one surface of one surface of the lower base layer in which the second light control part contacts. As described above, the light totally reflected in the transparent base layer portion that directly contacts the fingerprint, except for the totally reflected light at the interface of the low refractive layer, can be sensed at the sensor part by reaching the lower low refractive layer or being transmitted through the lower low refractive layer, whereby the sensor part can recognize the pattern of the object contacting the transparent base layer, that is, the fingerprint. In one example, the sensor part may be transparent.

In one example, the device may further comprise a screen display part. The screen display part may be, for example, a constitution such that an image or a moving image reproduced by the device can be viewed by the user. As in FIG. 1, the screen display part may be positioned on one surface of the sheet lower low refractive layer, more specifically, the opposite one surface of one surface of the lower low refractive layer where the second light control part contacts.

In another example, the device may simultaneously comprise a screen display part and a sensor part. In this case, the device may sequentially comprise a screen display part, a sensor part and a sheet, or may sequentially comprise a sensor part, a screen display part and a sheet. In addition, any one of the screen display part and the sensor part may also form one layer with the light source part.

In another example, the device may further comprise one part for performing a display function and a sensor function at the same time. In this case, the one part may also form one layer with the light source part.

Figure 2:
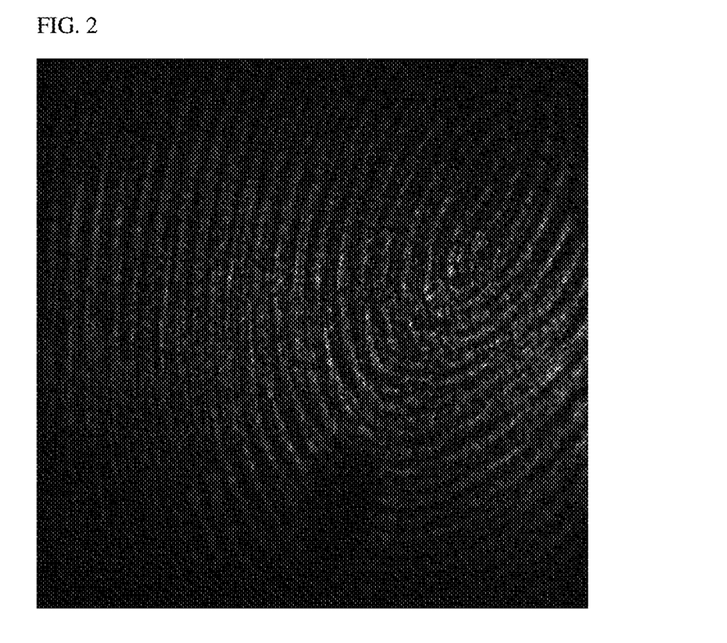
FIG. 2 is an image of a fingerprint photographed using a sheet according to one embodiment of the present application.

FIG. 2 is an image of a fingerprint photographed using a sheet according to one embodiment of the present application. As the sheet used for photographing, a laminate sequentially comprising a lower low refractive layer having a refractive index of 1.41 for light having a wavelength of 532 nm, a light control layer including a holographic film having a refractive index of 1.50 for light having a wavelength of 532 nm, an upper low refractive layer having a refractive index of 1.41 for light having a wavelength of 532 nm and a glass base layer (cover glass) having a refractive index of 1.51 for light having a wavelength of 532 nm was used. In the case of the light control layer, it was produced using a known photopolymer film. Specifically, a diffraction pattern was recorded on the light control layer, so that the first light control part could emit the incident light with 73° based on the normal to the sheet (transparent base layer) and the second light control part could emit some of the incident light with an angle of 45° based on the normal to the sheet (transparent base layer. Thereafter, the sheet was irradiated with an external light with 0° based on the normal to the sheet (transparent base layer), and the image appearing at the bottom of the lower low refractive layer by contacting a fingerprint with the surface of the transparent base layer was photographed with a CCD (charge-coupled device).

As described above, the invention of the present application has been described with reference to FIGS. 1 and 2 which are exemplary embodiments of the present application, but the scope of protection of the present invention is not limited to the above-described specific embodiments and drawings. In addition, it will be understood by those having ordinary knowledge in the technical field to which the present technical field pertains that the inventions described in the claims can be changed or modified variously within the technical spirit and scope of the present invention as filed.

The invention claimed is:

1. A sheet comprising a lower low refractive layer; a light control layer positioned on the lower low refractive layer and having a first light control part and a second light control part; an upper low refractive layer positioned on the light control layer; and a transparent base layer sequentially, wherein the lower and upper low refractive layers are layers having lower refractive index than that of the light control layer, wherein the first light control part is provided so as to emit light at a second angle ($\theta_A$), which is totally reflected from the lower surface of the upper low refractive layer and the upper surface of the lower low refractive layer, respectively, to the lower surface of the upper low refractive layer, out of light incident on the lower surface of the first light control part at a first angle ($\theta_0$) through the lower low refractive layer, the second light control part is provided so as to emit light at the second angle ($\theta_A$) and light at a third angle ($\theta_B$) different from the second angle ($\theta_A$) to the lower surface of the upper low refractive layer, out of light totally reflected from the lower surface of the upper low refractive layer and incident on the second light control part at the second angle ($\theta_A$), and wherein the sheet is provided such that the light emitted at the third angle ($\theta_B$) from the second light control part is transmitted through the lower surface of the upper low refractive layer by satisfying the following relational expression 3:

$$\theta_B < (180°/\pi) \times \sin^{-1}(n_2/n_3)$$ [Relational Expression 3]

wherein, $n_2$ is the refractive index of the upper low refractive layer, $n_3$ is the refractive index of the second light control part in the light control layer, and $n_3$ is larger than $n_2$.

2. The sheet according to claim 1, wherein the sheet is provided such that the light emitted at the second angle ($\theta_A$) from the first light control part is totally reflected from the lower surface of the upper low refractive layer and the upper surface of the lower low refractive layer, respectively, by satisfying the following relational expressions 1 and 2:

$$\theta_A > (180°/\pi) \times \sin^{-1}(n_2/n_3)$$ [Relational Expression 1]

$$\theta_A > (180°/\pi) \times \sin^{-1}(n_4/n_3)$$ [Relational Expression 2]

wherein, $n_2$ is the refractive index of the upper low refractive layer, $n_3$ is the refractive index of the first light control part in the light control layer, $n_4$ is the refractive index of the lower low refractive layer, and $n_3$ is larger than $n_2$ and $n_4$, respectively.

3. The sheet according to claim 1, wherein the first light control part and the second light control part comprise each a diffractive optical element or a refractive optical element.

4. The sheet according to claim 3, wherein the first light control part and the second light control part comprise each a holographic film.

5. The sheet according to claim 3, wherein the lower low refractive layer and the upper low refractive layer comprise each an acrylic transparent pressure-sensitive adhesive layer or a silicone transparent pressure-sensitive adhesive layer.

6. The sheet according to claim 5, wherein the transparent base layer comprises glass or a polymer resin.

7. The sheet according to claim 1, wherein the sheet is provided such that the light incident on the lower surface of the upper low refractive layer at the third angle ($\theta_B$) is incident on the transparent base layer at a fourth angle ($\theta_{B'}$) different from the third angle ($\theta_B$) while being transmitted through the upper low refractive layer, and the light at the fourth angle ($\theta_{B'}$) is totally reflected from the upper surface of the transparent base layer contacting air by satisfying the following relational expression 4 and the light at the fourth angle ($\theta_{B'}$) is transmitted through the upper surface of the transparent base layer where an object having a pattern with different heights and the transparent base layer directly contact by satisfying the following relational expression 5:

$$\theta_{B'} > (180°/\pi) \times \sin^{-1}(n_0/n_1)$$ [Relational Expression 4]

$$\theta_{B'} < (180°/\pi) \times \sin^{-1}(n_h/n_1)$$ [Relational Expression 5]

wherein, $n_0$ is 1 as the refractive index of air, $n_1$ is the index of refraction of the transparent base layer, and $n_h$ is the refractive index of the portion of the object having a pattern with different heights in direct contact with the transparent base layer when the object having a pattern with different heights is in contact with the transparent base layer.

8. The sheet according to claim 7, wherein the sheet is provided such that the light at the fourth angle ($\theta_{B'}$) totally reflected from the upper surface of the transparent base layer contacting air is transmitted through the upper surface of the upper low refractive layer by satisfying the following relational expression 6:

$$\theta_{B'} < (180°/\pi) \times \sin^{-1}(n_2/n_1)$$ [Relational Expression 6]

wherein, $n_1$ is the refractive index of the transparent base layer, $n_2$ is the refractive index of the upper low refractive layer, and $n_1$ is larger than $n_2$.

9. The sheet according to claim 8, wherein the sheet is provided such that the light at the fourth angle ($\theta_{B'}$) totally reflected from the upper surface of the transparent base layer contacting air passes through the upper low refractive layer and the light control layer to reach the lower surface of the lower low refractive layer by satisfying the following relational expression 7:

$$\theta_{B'} < (180°/\pi) \times \sin^{-1}(n_4/n_1)$$ [Relational Expression 7]

wherein, $n_1$ is the refractive index of the transparent base layer and $n_4$ is the refractive index of the lower low refractive layer.

10. The sheet according to claim 9, wherein the transparent base layer further comprises one or more of functional films consisting of a hardness-enhancing film, an antifouling film, a decoration film and an antireflection film.

11. The sheet according to claim 1, wherein the sheet is used for optical fingerprint recognition or optical fingerprint input.

12. An optical fingerprint recognition or input device comprising the sheet according to claim 1.

13. The optical fingerprint recognition or input device according to claim 12, further comprising a light source part, wherein the light source part is located on the opposite one surface of one surface of the lower low refractive layer where the first light control part contacts.

14. The optical fingerprint recognition or input device according to claim 13, wherein the light source part is provided so as to emit vertical light to the first light control part.

15. The optical fingerprint recognition or input device according to claim 14, further comprising one or more of a screen display part and a sensor part.

* * * * *